US012012873B2

United States Patent
Ford

(10) Patent No.: US 12,012,873 B2
(45) Date of Patent: *Jun. 18, 2024

(54) APPARATUS AND METHOD OF UTILIZING THERMAL ENERGY USING MULTI FLUID DIRECT CONTACT HYDRAULIC CYCLES

(71) Applicant: BOUNDARY ENERGY INC., Spruce Grove (CA)

(72) Inventor: Darrell Ford, Spruce Grove (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,745

(22) Filed: Jun. 21, 2022

(65) Prior Publication Data
US 2022/0325641 A1    Oct. 13, 2022

Related U.S. Application Data

(63) Continuation of application No. 16/494,054, filed as application No. PCT/CA2018/050308 on Mar. 14, 2018, now Pat. No. 11,396,829.

(60) Provisional application No. 62/471,109, filed on Mar. 14, 2017.

(51) Int. Cl.
| F01K 27/00 | (2006.01) |
| F01K 13/00 | (2006.01) |
| F03D 9/22  | (2016.01) |
| F03G 7/00  | (2006.01) |
| F28C 3/08  | (2006.01) |

(52) U.S. Cl.
CPC .............. *F01K 27/00* (2013.01); *F01K 13/00* (2013.01); *F03D 9/22* (2016.05); *F03G 7/0254* (2021.08); *F28C 3/08* (2013.01); *F05B 2220/301* (2013.01); *F05B 2220/706* (2013.01)

(58) Field of Classification Search
CPC . F01K 27/00; F01K 13/00; F03D 9/22; F03G 6/003; F03G 7/00; F03G 7/04; F28C 3/08; F05B 2220/301; F05B 2220/706
USPC .................................................. 60/649, 673
See application file for complete search history.

(56) References Cited

U.S. PATENT DOCUMENTS

| 4,370,860 A * | 2/1983 | Assaf ................... F03G 3/00 60/641.11 |
| 5,946,915 A * | 9/1999 | Hays ................... F01D 1/32 60/649 |
| 8,256,219 B2 * | 9/2012 | Hinders ............... F28F 19/02 60/660 |
| 11,396,829 B2 * | 7/2022 | Ford ................... F01K 13/00 |

(Continued)

FOREIGN PATENT DOCUMENTS

WO      WO 91/07573      * 5/1991

*Primary Examiner* — Hoang M Nguyen

(57) ABSTRACT

Apparatus for extracting useful work or electricity from low grade thermal sources comprising a chamber, a source of heated dense heat transfer fluid in communication with the chamber, a source of motive fluid in communication with the chamber, wherein the motive fluid comprises a liquid phase, a flow control mechanism cooperating with the source of heated dense heat transfer fluid and with the source of motive fluid to deliver said fluids into the chamber in a manner that said fluids come into direct contact with each other in the chamber to effect a phase change of the motive fluid from liquid to gas to increase the pressure within the chamber to yield pressurized fluids, and a work extracting mechanism in communication with the chamber that extracts work from the pressurized fluids by way of pressure let down.

11 Claims, 17 Drawing Sheets

(56) References Cited

U.S. PATENT DOCUMENTS

2015/0377080 A1* 12/2015 Fortini .................. F01K 23/065
                                                        60/671

* cited by examiner

APPARATUS AND METHOD OF UTILIZING THERMAL ENERGY USING MULTI FLUID DIRECT CONTACT HYDRAULIC CYCLES

FIELD OF THE INVENTION

The present invention relates to systems and methods for converting thermal energy into useful products such as mechanical work, electricity or space heating. More particularly the present invention pertains to the field of clean power production and an emission-less power extraction system for use in converting thermal energy into electricity from sources such as solar, wind, waste heat, geothermal, biomass oxidation.

BACKGROUND OF THE INVENTION

There are numerous industrial and other processes that produce waste heat in the approximate range of 34° F. to 210° F. In addition, heat in these low grade thermal ranges may also be obtained from geothermal sources, including man-made geothermal sources such as those occurring in abandoned oil and natural gas wells, as well as natural water bodies (oceans, lakes, rivers), solar and wind sources. Heat in this range is difficult to utilize since it too low to be used in conventional Rankin cycle or other vapor cycles to generate useful energy. Accordingly, there is a need for a more efficient method of extracting useful work and electricity from low grade thermal sources.

SUMMARY OF THE INVENTION

The invention comprises methods and systems for utilizing two or more fluids in combination with each other where the fluids differ in density, specific heat capacity and phase change properties. wherein at least one of the fluids experiences a phase change at lower temperatures and has a low specific gravity, referred to herein as the motive fluid (MF), and wherein at least one of the fluids has a high specific gravity, a high specific heat capacity and does not experience phase change at the upper temperature range of the cycle operating profile, referred to herein as the dense heat transfer fluid (DHTF). The method utilizes flows and processes in which two or more fluids are placed in direct contact with each other in a chamber, resulting in a dramatic expansion of the motive fluid as it changes phase from liquid to vapor at relatively low temperatures as it absorbs energy from the dense heat transfer fluid, which experiences a reduction in temperature and remains in a liquid state. The phase change from liquid to vapor of the motive fluid produces a large volume increase with a corresponding pressure increase, which can then be sent to the inlet of various mechanical extractions machinery suitable for conversion of the pressurized vapor flow to useful work.

Another key feature of utilizing fluids that differ in phase change temperatures and specific gravity/density is that due to differing densities in both liquid and vapor states, the motive fluid does not remain mixed with the dense heat transfer fluid and quickly experiences gravity separation when combined/contained in the same space or container. This density or gravity separation characteristic allows for direct contact heat transfer, eliminating costly heat exchangers and resulting in faster heat transfer performance and thereby higher overall system efficiencies than a single fluid system. Also, the dense heat transfer fluid does not change phase during the exchange and therefore does not require cooling after the power extraction while still providing the hydraulic mass flow for power extraction. In contrast, the motive fluid volumes, which have changed phase from liquid to vapor and require condensing to return to liquid phase, make up a much smaller percentage of the overall mass-flow and serve to provide only the volume change function of the mass flow. This split between the motive fluid volumes and the dense heat transfer fluid volumes requires less heat recuperation/cooling and parasitic loads associated with condensing of all fluids, resulting in greater efficiencies and the ability to create substantial amounts of useful work from very low temperature heat sources.

In one aspect the present invention provides an apparatus for extracting useful work or electricity from low grade thermal sources comprising: a chamber; a source of heated dense heat transfer fluid in communication with the chamber; a source of motive fluid in communication with the chamber, wherein the motive fluid comprises a liquid phase; a flow control mechanism cooperating with the source of heated dense heat transfer fluid and with the source of motive fluid to deliver said fluids into the chamber in a manner that said fluids come into direct contact with each other in the chamber to effect a phase change of the motive fluid from liquid to gas to increase the pressure within the chamber to yield pressurized fluids; and a work extracting mechanism in communication with the chamber that extracts work from the pressurized fluids by way of pressure let down.

As used herein, "chamber" means an enclosed cavity of any shape or dimension suitable to provide a static fixed volume or a moving fixed volume capable of volumetrically limiting the motive fluid as it combines with the dense heat transfer fluid and as the mixture expands to motive fluid gaseous phase thereby creating an increase in pressure in the enclosed cavity.

In some embodiments, apparatus may further comprise a density separator downstream of the work extracting mechanism to separate the dense heat transfer fluid from the motive fluid.

In some embodiments, apparatus may further comprise a condenser downstream of the work extracting mechanism to condense the motive fluid into liquid phase.

In some embodiments, apparatus may further comprise a first recirculating conduit to the source of motive fluid.

In some embodiments, apparatus may further comprise a second recirculating conduit to recirculate the dense heat transfer fluid to the source of heated dense heat transfer fluid.

In some embodiments, apparatus may further comprise a heat exchanger communicating with a thermal source and the second recirculating conduit to transfer heat energy from the thermal source to the dense heat transfer fluid to provide the source of heated dense heat transfer fluid.

In some embodiments, the flow control mechanism may comprise a rotary valve having a first pocket to receive a volume of heated dense heat transfer fluid and a second pocket to receive a volume of motive fluid, the rotary valve being operable to expose the first pocket and the second pocket to the chamber to bring said fluids into direct contact.

In some embodiments, the work extracting mechanism may comprise a turbine that is driven by the pressurized fluids to rotate an output shaft to produce work.

In some embodiments, the work extracting mechanism may comprise a reciprocating piston that is driven by the pressurized fluids to rotate an output shaft to produce work.

In another aspect, the present invention provides a method of extracting useful work or electricity from low grade thermal sources comprising the steps of: heating a dense heat transfer fluid using heat from a thermal source; mixing the heated dense heat transfer fluid with a motive fluid comprising a liquid phase in a chamber to effect a phase change of the motive fluid from liquid to gas to increase the pressure within the chamber and yield pressurized fluids; and using the energy of the pressurized fluids to produce useful work.

In some embodiments, the dense transfer fluid may be heated in step a. to a temperature of about 34° F. to about 210° F.

In some embodiments, the method may further comprise the step of cooling the motive fluid after step c. to effect a phase change of the motive fluid to liquid.

The embodiments described herein employs $CO_2$ or various organic fluids such as R134a or R290 as the motive fluid, and fluids such as Ethylene Glycol or Glycerol as the dense heat transfer fluid. However, it will be apparent from the disclosure herein that other fluids may be used as the motive fluid and the dense heat transfer fluid.

Heat energy for use with the invention may be collected and stored in a thermal storage system comprising of an insulated storage container, where thermal energy in a range from about 80° F. to about 210° F. is transferred to the water from a variety of thermal sources such as solar, wind to thermal, geothermal, waste heat from mobile or stationary processes, or in some cases, the oxidation of bio-mass.

The foregoing was intended as a broad summary only and of only some of the aspects of the invention. It was not intended to define the limits or requirements of the invention. Other aspects of the invention will be appreciated by reference to the detailed description of the preferred embodiment and to the claims.

BRIEF DESCRIPTION OF THE DRAWINGS

These and other features of the invention will become more apparent from the following description in which reference is made to the appended drawings and wherein.

DETAILED DESCRIPTION

Figure 1:
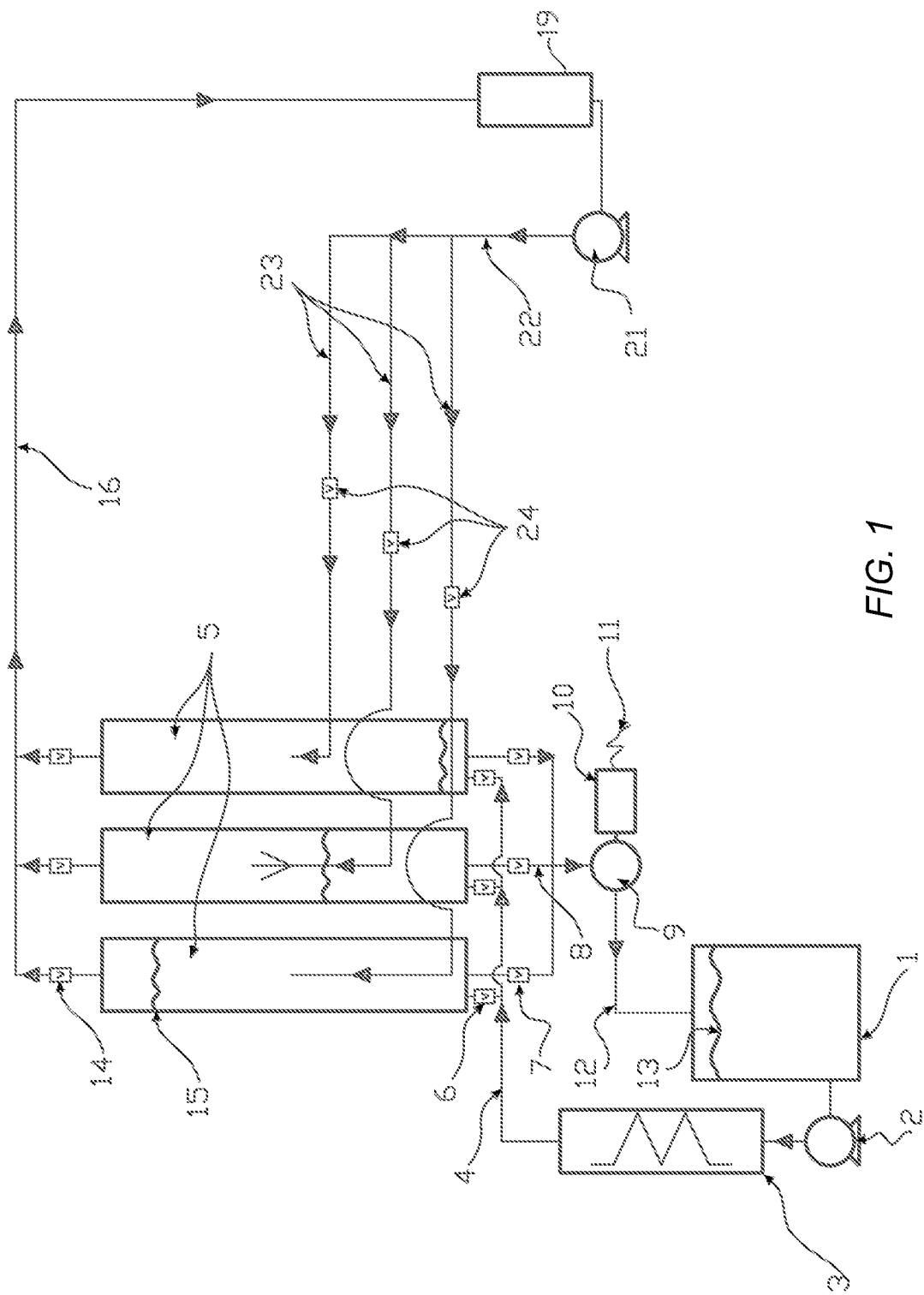
FIG. 1 is a process flow diagram of an emission-less power extraction system utilizing the Multi Fluid Direct Contact Pulsating Cycle for the conversion of thermal energy into electricity from sources such as solar, wind, waste heat, geothermal, biomass oxidation according to the present invention.

An embodiment of the present invention for the conversion of thermal energy into electricity from sources such as solar, wind, waste heat, geothermal, biomass oxidation, referred to herein as a multi fluid direct contact pulsating cycle (motive fluid-DCPC), is shown in FIG. 1. The present invention may extract useful work from any thermal source capable of being delivered at temperatures between 80° F. to 210° F. More specifically, the present invention may be used to extract useful work form thermal sources such as solar, wind, waste heat, geothermal, biomass oxidation, and others.

Figure 2:
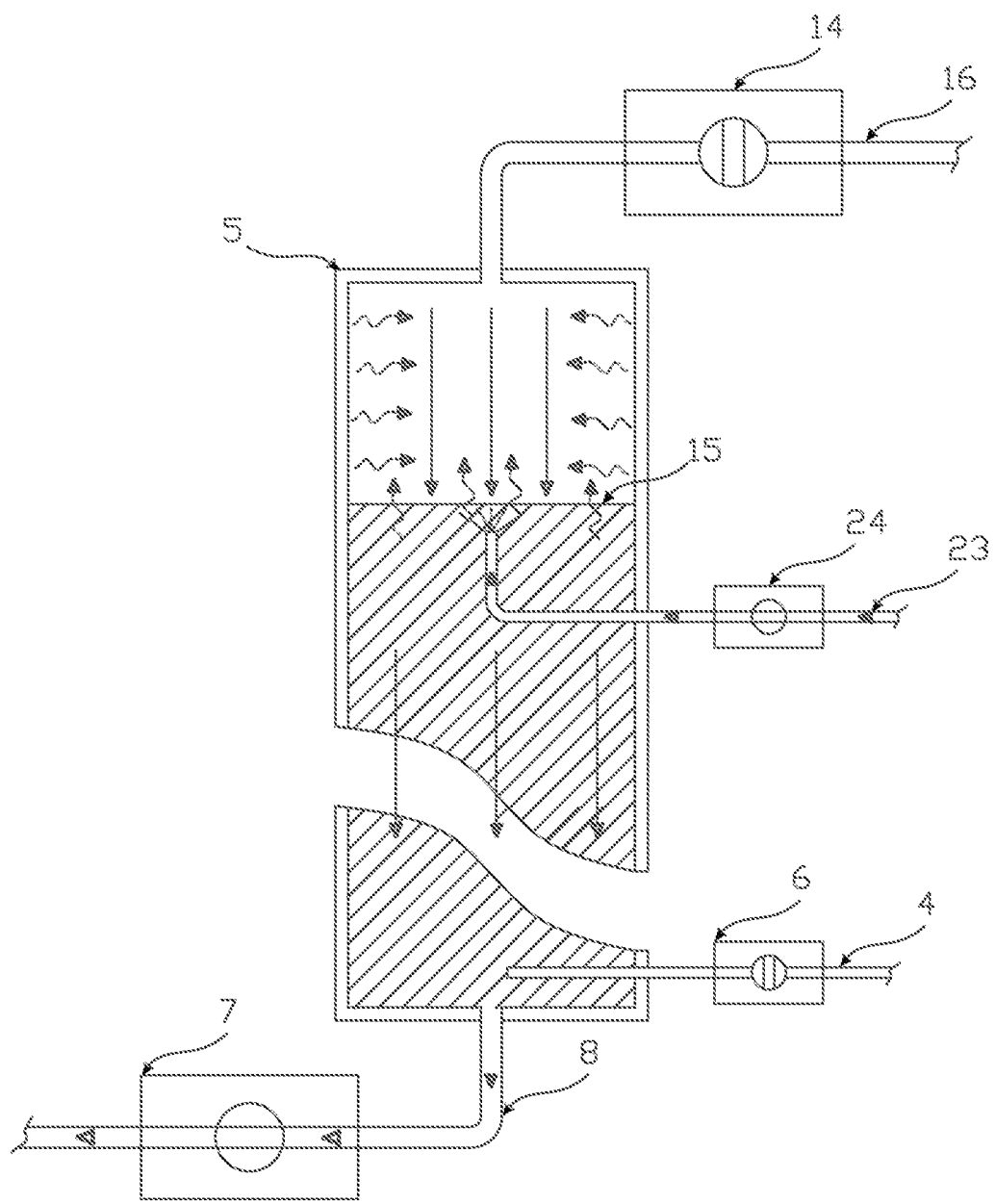
FIG. 2 is a detailed representative view of one accumulator during the Discharge phase of the cycle according to the present invention taken from a side profile view.
Figure 3:
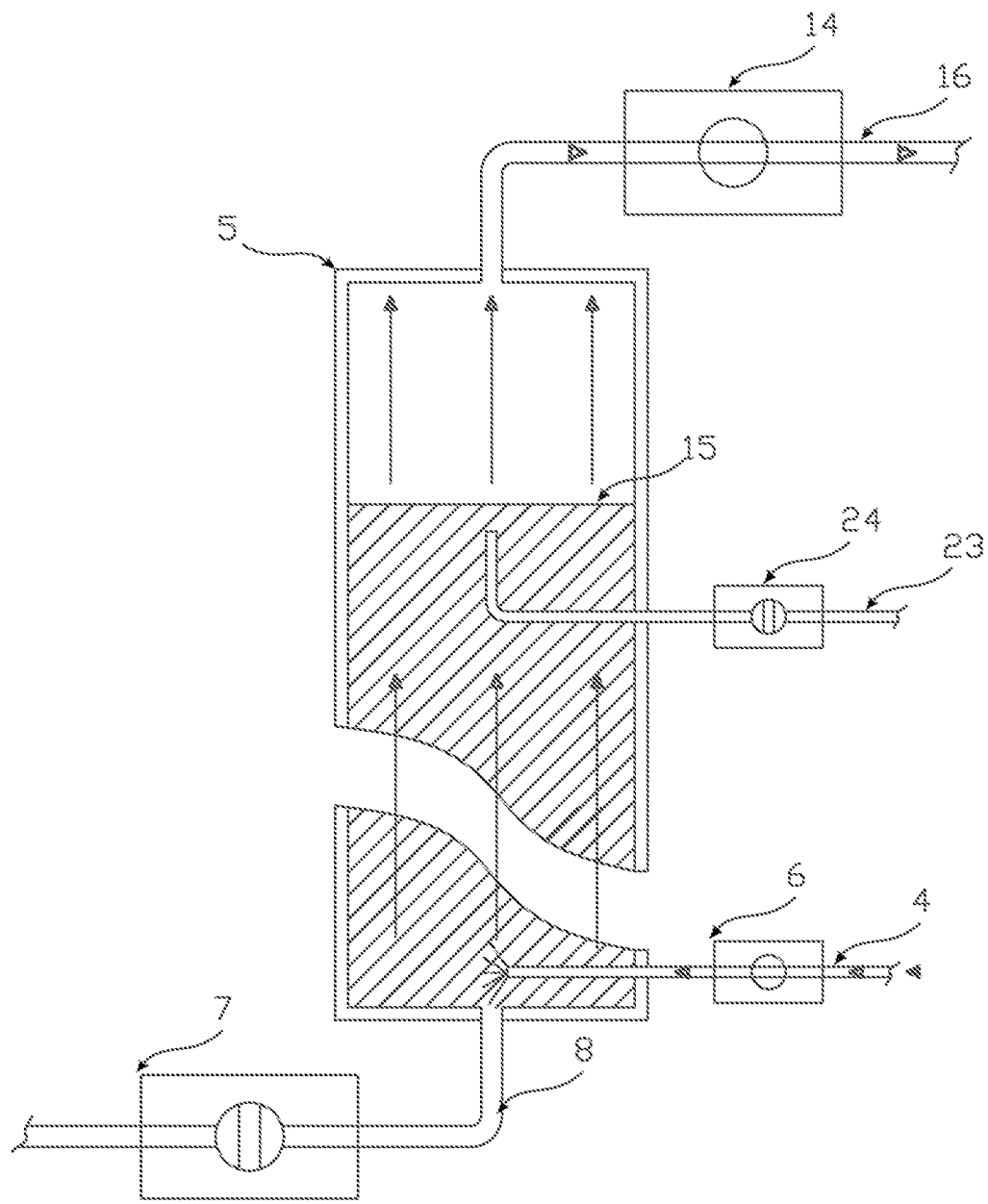
FIG. 3 is a detailed representative view of one accumulator during the Recharge phase of the cycle according to the present invention taken from a side profile view.

Referring to FIGS. 1-3, the illustrated embodiment of the multi fluid direct contact pulsating cycle is shown comprising three sealed chambers or accumulators 5, into each of which is provided a metered flow of motive fluid via conduits 23, and a metered flow of dense heat transfer fluid via conduits 4. Control of the fluid flow is accomplished by valves 24 and 6, respectively. In general terms, each accumulator 5 is provided with a volume of "hot" dense heat transfer fluid into which is injected a volume of "cold" motive fluid. Heat is transferred from the dense heat transfer fluid to the motive fluid, which rises to the top and undergoes a volume expansion as it changes phase from a liquid to a gas. This volume expansion within the confined space of the accumulator 5 increases the pressure within the accumulator, and upon the timed release of valves 7 on the bottom of the accumulator a volume of dense heat transfer fluid is forced under pressure through an expander such as hydraulic motor 9, in which the flow of the dense heat transfer fluid is converted to useful work. After passing through the hydraulic motor 9, the "cooled" dense heat transfer fluid may be stored if necessary in reservoir 1 and is reheated in heat exchanger 3 utilizing heat from the heat source, and then recirculated into the accumulator 5 to recharge the accumulator for the cycle to repeat.

After the heating and the expansion of the motive fluid, the motive fluid in the gas phase (or mixed gas-liquid phases) is allowed to vented out of the top of the accumulator by opening valves 14 as the level of the dense heat transfer fluid rises during the recharge phase, and the motive fluid passes through conduit 16 to a condenser step 19 where the motive fluid is cooled and condensed back to a liquid phase, after which it is directed via conduit 22 into conduits 23 for injection back into the accumulators 5 for the cycle to repeat.

Figure 4:
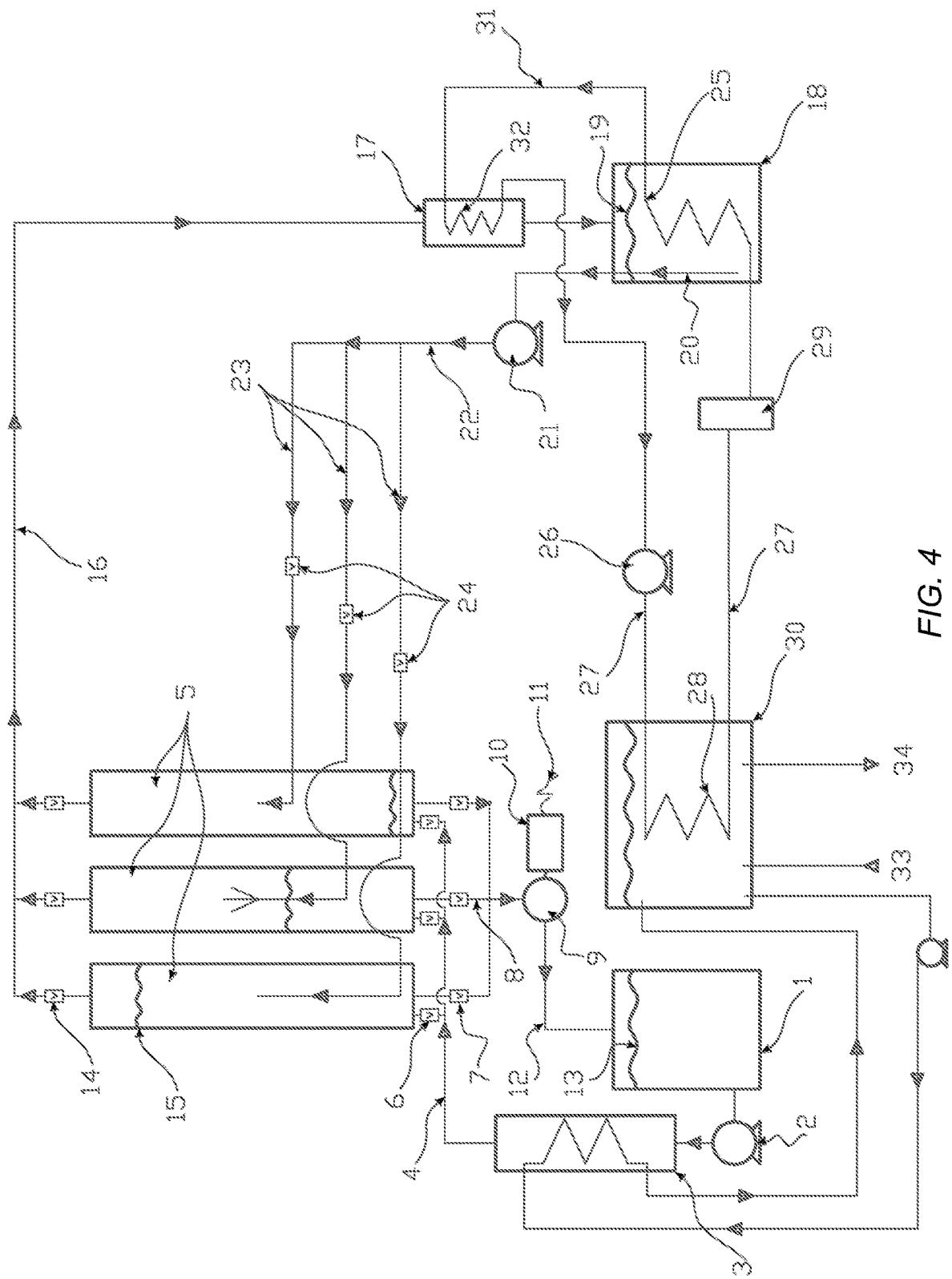
FIG. 4 is a process flow diagram of another embodiment of an emission-less power extraction system utilizing the Multi Fluid Direct Contact Pulsating Cycle for the conversion of thermal energy into electricity from sources such as solar, wind, waste heat, geothermal, biomass oxidation according to the present invention.

With reference to FIGS. 2-4, aspects of the present invention are described in more detail in reference to an embodiment shown illustrated in FIG. 4.

Multi-Fluid Flow and Pulsation Features:

A critical feature of the multi fluid direct contact pulsating cycle is in the unique employment of two or more fluids, varying in density and phase change characteristics, in a 3-step power cycle involving three distinct thermal and pressure stages (1) Re-charge; (2) Ready and (3) Discharge. These three stages result in a 'pulsating' flow to the hydraulic motor/expander unit(s). For example, in the case of a three chamber and one hydraulic expander system as described herein, one chamber is in re-charge mode, one is in discharge mode, and one is in ready mode. A programmable logic controller (PLC) or other controller manages the timing of the valving to cycle effectively for coordinating the three steps taking place in each of the chamber units or accumulators 5 as needed to provide a steady flow of hydraulic fluid to the hydraulic expander. This pulsating characteristic results in the expander seeing a gentle swinging pressure gradient ranging from the high pressure of the cycle to the low pressure of the cycle—in this case 2000-3000 PSI to 350-650 PSI, an average in this example of 1500 PSI at the inlet to the hydraulic motor/expander. This pulsation characteristic also results in a corresponding pulsation of power output from the hydraulic expander output shaft. To accommodate this unique feature, the system employs DC generators sending DC electrical energy to DC batteries which are not negatively affected by the pulsation feature—which appears as a wave of amperage at a set voltage (controlled by a voltage regulator which looks at the shaft RPM and increases or decreases the load on the Alternator windings as needed to maintain the target voltage as well as the shaft rpm). AC current is then drawn from the DC batteries via standard inverter equipment thereby delivering a very high quality AC power to the end use.

The three distinct and separated thermal and pressure stages: A. Re-charge; B. Ready; and C. Discharge are further described with reference to FIGS. 2-4.

A. During the Re-charge phase dense heat transfer fluid is moved against condenser 18 vapor pressure, 350 psi-650 psi, from reservoir 1 by pump 2, passing through heat exchanger 3 and is heated to the target temperatures required, in this case approximately 140° F. The dense heat transfer fluid continues via header 4 to enter the bottom of one of three accumulator chambers 5 via a valve 6. The hot dense heat transfer fluid flows into the accumulator 5 until the desired level is reached which is controlled by valve 6 in reaction to level sensors placed at the appropriate elevation in the accumulator 5 and a PLC.

Also during the re-charge step, as the level of the dense heat transfer fluid rises in the accumulator 5 the motive fluid is displaced from the accumulator 5 at condenser 18 vapor pressure levels, in this case approximately 350-650 psi, and exits the top of the chamber via valve 14 and travels via conduit 16 through recuperator 17 and into condenser 18 where it is cooled adequately to return to a liquid phase.

B. During the Ready step liquid phase motive fluid flows from condenser 18 via conduit 20 into pump 21 where it is pressurized initially to condenser 18 pressures and then flows via conduit 22 to one of the conduits 23 via a valve 24 which is controlled by the PLC. On passing one of the valves 24 the motive fluid enters accumulator 5. During this step, a very controlled amount of liquid motive fluid is injected at pressures from condenser 18 pressures into the accumulator 5 where the motive fluid comes into direct contact with the hot dense heat transfer fluid, absorbs thermal energy causing a phase change from liquid to vapor which in turn causes the pressure to increase in the accumulator to the desired level of approximately 1500 psi. At this point the accumulator is ready to go to the discharge step.

C. During the Discharge or power step one of valve 7 are opened allowing dense heat transfer fluid to flow via conduit 8 at high pressures into hydraulic motor 9. Work is extracted from the dense heat transfer fluid by the hydraulic motor which in turn drives an electrical generator 10. The dense heat transfer fluid, now slightly cooled and at condenser 18 pressures exits the hydraulic motor 9 via conduit 12 and enters reservoir 1 from where it can further continue to the re-charge step of the circuit. Simultaneously the motive fluid is pumped from condenser 18 via conduit 20 by pump 21. motive fluid is compressed to discharge system pressure by pump 21 and flows via conduit 22 into one of conduit 23 and through valve 24 and into accumulator 5. Upon entering the accumulator, the motive fluid comes into contact with the hot dense heat transfer fluid effectively absorbing thermal energy and experiencing rapid phase change. Due to the density difference between the motive fluid vapor and the dense heat transfer fluid the motive fluid vapor rapidly moves upward in the accumulator column arriving at the top of the accumulator where it continues to expand to its vapor pressure at the temperatures present in the accumulator, effectively creating a downward force on the dense heat transfer fluid column. Due to this pressure the dense heat transfer fluid is forced downward and out the bottom of accumulator 5. Over the duration of the pulse a minimum level is reached in the accumulator 5 required to maintain a fluid seal which ensures that none of the motive fluid exits the bottom of the accumulator and into the hydraulic motor 9. This minimum dense heat transfer fluid level is controlled by level sensors and the PLC actuating a valve 7. The downward flow of high pressure dense heat transfer fluid travels via valve 7 and conduit 8 and into hydraulic motor 9 to produce useful work as described above. The motive fluid flow is precisely controlled by valve 24 via a PLC to inject only the necessary liquid volume of motive fluid needed, which when changed to vapor, provides the desired downward motive force/pressure to the dense heat transfer fluid column. The discharge step ends with valve 7 closed with the accumulator at or slightly above condenser 18 pressures and the volume being substantially made up of motive fluid at vapor phase and vapor pressure with a suitable layer of dense heat transfer fluid remaining at the bottom of the accumulator acting as a barrier or seal preventing any motive fluid vapor from exiting the accumulator and entering hydraulic pump 9.

The above 3 steps continue in a rotation on each of the 3 accumulators whereby the cycle from re-charge, ready, discharge continues in a sequence controlled by the PLC providing a constant pulsating flow of high pressure hydraulic fluid to the expander 9 to drive the electric generator 10. Work is extracted via a work extracting mechanism that extracts work from the pressurized fluids by way of pressure let down, in this case, the expander 9.

Energy Recovery Feature:

The system described in FIG. 4 employs a closed loop refrigeration circuit to effectively recover the energy from the discharged and warm vapor phase motive fluid during the process of condensing the motive fluid in condenser 18. Refrigerant such as R134a is compressed adequate pressures to produce the required temperature profile, approximately 140° F., or the exchange of energy between the refrigerant and the system energy storage fluid contained in reservoir 30, in this case a water/glycol mixture. Compressed and hot refrigerant is conveyed by pump 26, traveling via conduit 27 to heat exchanger 28 where the refrigerant is cooled effectively transferring its heat energy to the energy storage fluid. It continues via conduit 27 to Pressure Reduction Valve (PRV) 29 where its pressure is reduced to approximately 25 psi with corresponding drop in temperature to approximately 6° F. The refrigerant then continues into heat exchanger 25 located in the motive fluid condenser 18 where it absorbs energy from the vapor phase motive fluid. The refrigerant then travels via conduit 31 to recuperate 17 through heat exchanger 32 where it is further heated by the incoming vapor phase motive fluid. The refrigerant, now 'thermally loaded' continues to the inlet of compressor 26 whereby it is compressed to approximately 150200 psi causing a increase in temperatures, to approximately 140° F., providing an adequate temperature delta for transfer of thermal energy from the refrigerant into the energy storage fluid contained in reservoir 30. This completes the energy recovery cycle.

Thermal Energy In:

Thermal energy enters the system by the flow of heat water/glycol into reservoir 30 at approximately 180° F. which is heated by an outside source such as solar, thermal wind-mills, geothermal, and the like, and enters the thermal storage reservoir 30 via inlet 33 and exits via outlet 34.

FIG. 2 shows a detailed side view of an accumulator 5 during the discharge step. During the discharge step motive fluid enters the accumulator 5 via conduit 23 through valve 24. As the liquid motive fluid enters the accumulator it comes into direct contact with the hot dense heat transfer fluid resulting in rapid phase change of the motive fluid from liquid to vapor. The low-density motive fluid vapor immediately rises to the top of the accumulator column providing vapor head and the motive pressure needed to force the dense heat transfer fluid out the bottom of the accumulator via valve 7 and into hydraulic motor 9 for the production of useful work.

FIG. 3 shows a detailed side view of an accumulator during the re-charge step. dense heat transfer fluid is pumped into the bottom of accumulator 5 via conduit 23 and through valve 24 which is controlled by system PLC. As the level of the incoming dense heat transfer fluid rises, the motive fluid is forced out the top of the accumulator through valve and conduit, traveling via conduit 16 through recuperator 17 and into condenser 18, where it is cooled to liquid phase to continue into the Ready and Discharge steps.

Figure 5:
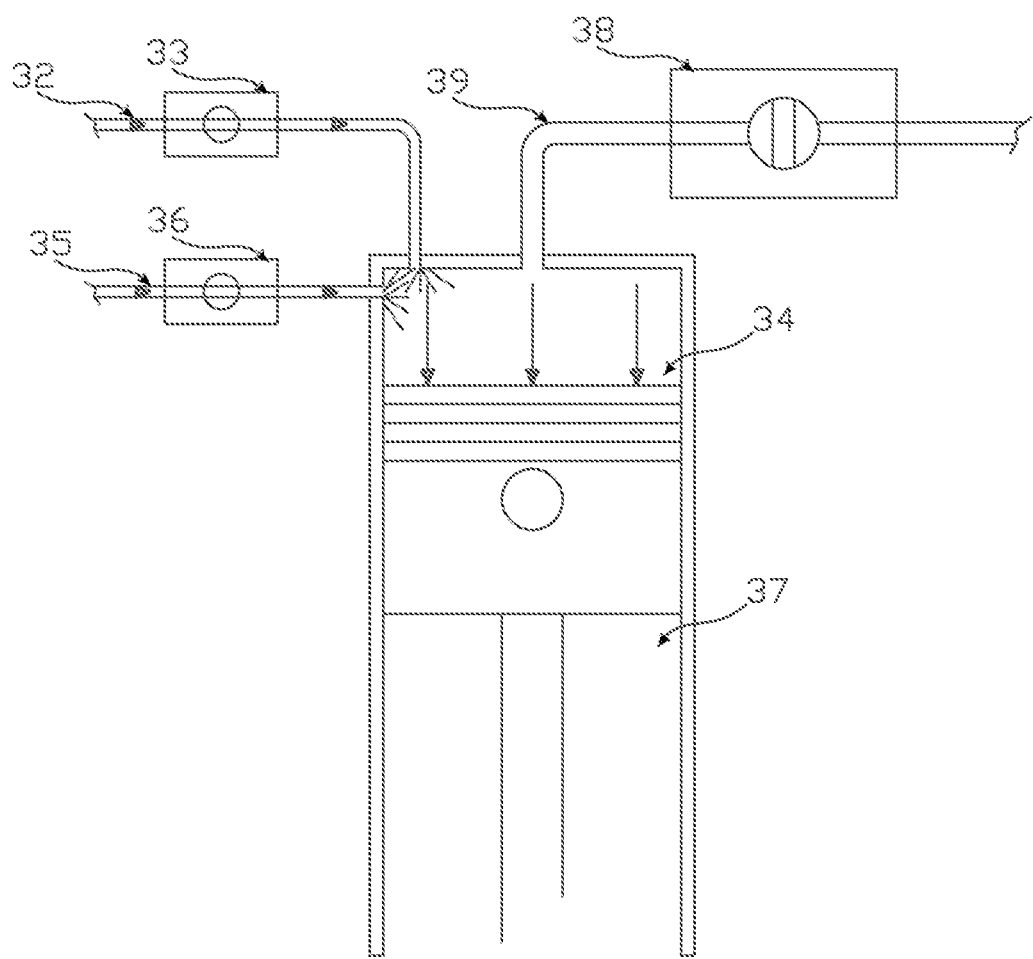
FIG. 5 is a detailed representative view of a piston expander method during the power stroke of the cycle according to the present invention taken from a side profile view.
Figure 6:
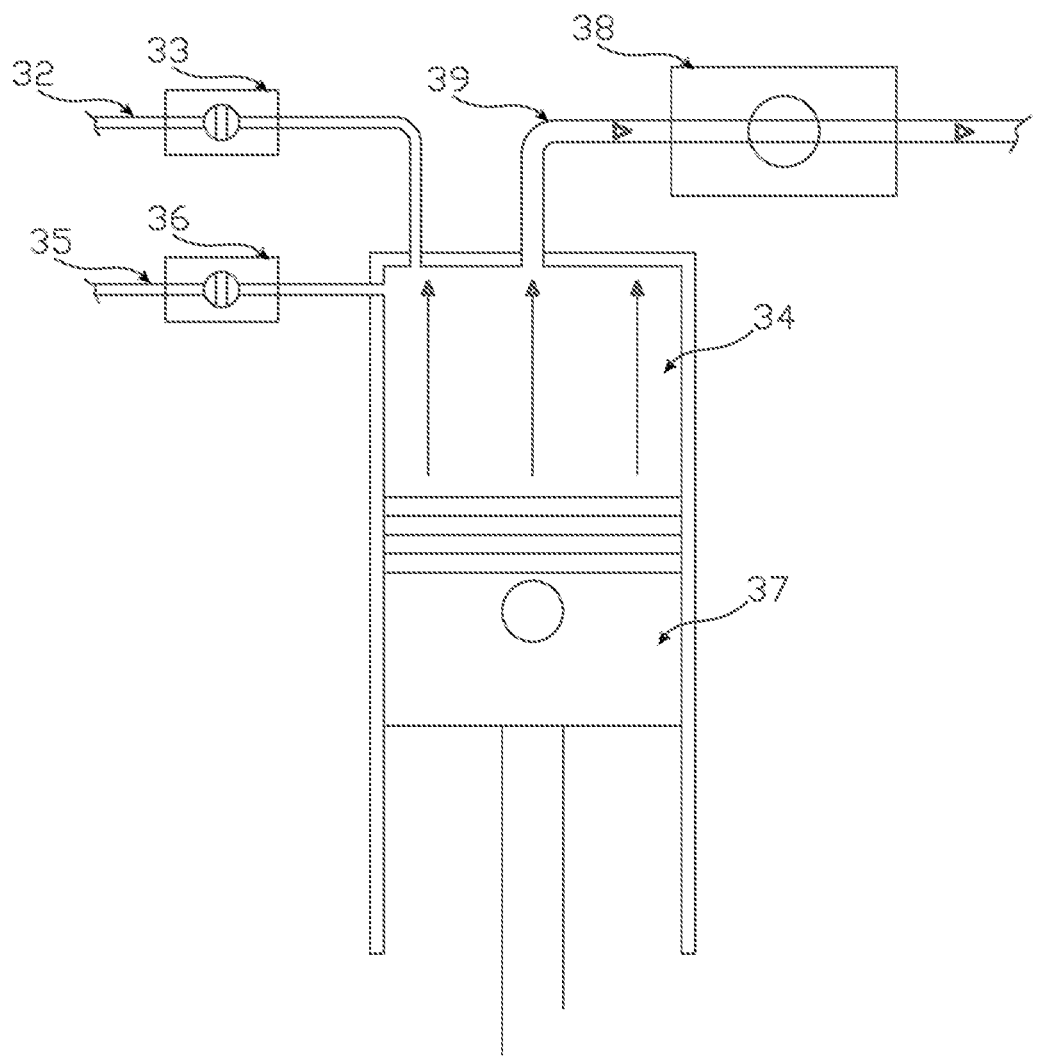
FIG. 6 is a detailed representative view of a piston expander method during the exhaust stroke of the cycle according to the present invention taken from a side profile view.

FIGS. 5 and 6 show an alternate energy extraction method in the form of a reciprocating piston expander utilizing a closed piston chamber and valving system much the same as an internal combustion engine without the combustion.

FIG. 5 shows the power stroke where high pressure liquid motive fluid and hot dense heat transfer fluid are separately injected into the piston chamber 34 via conduits 32 and 35 and valves 33 and 36. Valves 33 and 36 open very briefly allowing a measured amount of the fluid mixture into piston chamber 34 adequate to allow for complete expansion of the motive fluid as the piston travels downward and useful work is extracted.

FIG. 6 shows the exhaust stroke where valves 33 and 36 are closed and valve 38 allows the cooled and low pressure mixture of vapor phase motive fluid and dense heat transfer fluid to exit via valve 38 and conduit 39. As the piston travels upward in the cylinder, the piston chamber is reduced in volume forcing the low pressure vapor phase motive fluid and cooled dense heat transfer fluid mixture from the chamber. The discharged fluid mixture then continues via conduit 36 to a settling reservoir where the heavier dense heat transfer fluid remains on the bottom of the chamber and the lighter motive fluid vapor is drawn off the top of the settling chamber traveling on to a condenser where it is cooled and returned to a liquid phase to be pumped into valve 33 and into the piston chamber 34 during the power stroke. The dense heat transfer fluid is drawn from the bottom of the settling chamber and travels to a re-heater where its temperature is increased to the desired level before it is re-injected via valve 36 in piston chamber 34 during the power stroke. This is a two-stroke internal expansion cycle taking place at under 180° F. without combustion or exhaust to the environment.

Figure 7:
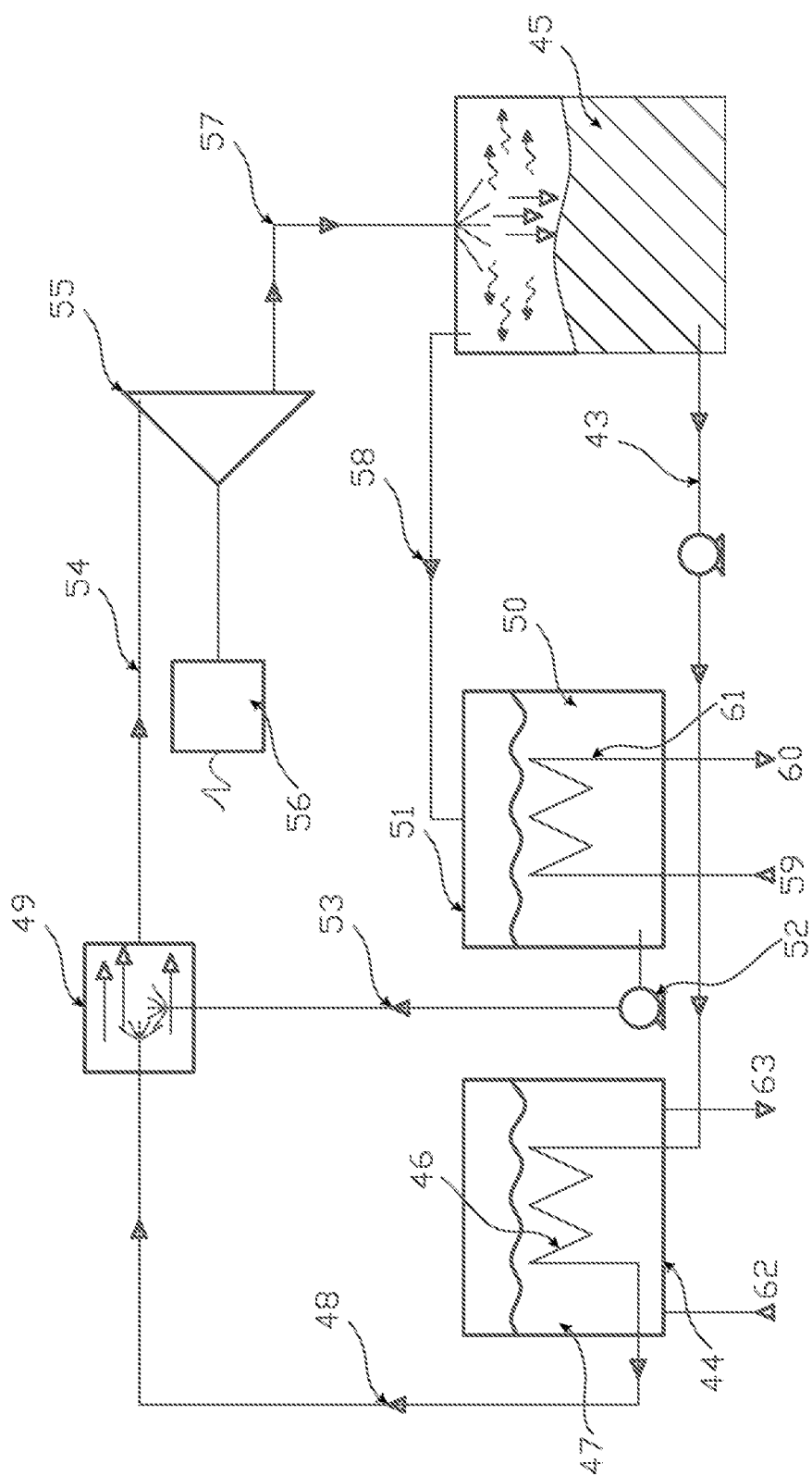
FIG. 7 is a process flow diagram of an emission-less power extraction system utilizing a multi fluid direct contact continuous cycle for the conversion of thermal energy into electricity from sources such as solar, wind, waste heat, geothermal, biomass oxidation according to the present invention.

FIG. 7 shows an alternate energy extraction method utilizing a constant flow approach method similar to a Rankine Cycle, Organic Rankine Cycle or Brayton Cycle, as opposed to a pulsating flow as described in FIG. 1 above. Reservoir 41 contains dense heat transfer fluid 45 which travels via conduit 43 to pump 42 where it is pressurized to system pressure, approximately 500-1000 PSI as it travels to heat exchanger 46 where it is effective heated to desired temperatures by absorbing heat energy from the thermal storage fluid in reservoir 44. The dense heat transfer fluid then continues via conduit 48 to blend chamber 49 where it is blended with incoming motive fluid from conduit 53. Liquid motive fluid is pumped from condenser 51 by pump 52 and travels via conduit 53 to mixing chamber 49 where it comes into direct contact and effectively 'mixes' with the hot dense heat transfer fluid coming from conduit 48 and pump 42. Upon contact the motive fluid rapidly expands to vapor phase as it absorbs thermal energy from the hot dense heat transfer fluid. Upon expansion, the now mixed-phase combined flow vapor motive fluid and liquid dense heat transfer fluid mixture continues into the inlet of expander/turbine 55 via conduit 54. Expander 55 converts the high pressure multi-phase flow to useful work by driving electrical generator 56. The fluid mixture then exits the expander 55 in a cooled but substantially multi-phase condition with the motive fluid being vapor and the dense heat transfer fluid being liquid. The mixture continues via conduit 57 into separation chamber 45. The motive fluid, being in vapor phase and significantly lighter than the dense heat transfer fluid, remains at the top of the chamber and continues via conduit 58 into condenser 51 where it is cooled and returned to liquid phase before continuing on the high-pressure side of the circuit. The dense heat transfer fluid is drawn off the bottom of settling chamber 45 and is then compressed by pump 42 to system pressure and continues via conduit 43 to the heat exchanger 46 where it is heated to the desired temperature and then continues on to the high pressure side of the circuit and the mixing chamber 49 via conduit 48.

Figure 8:
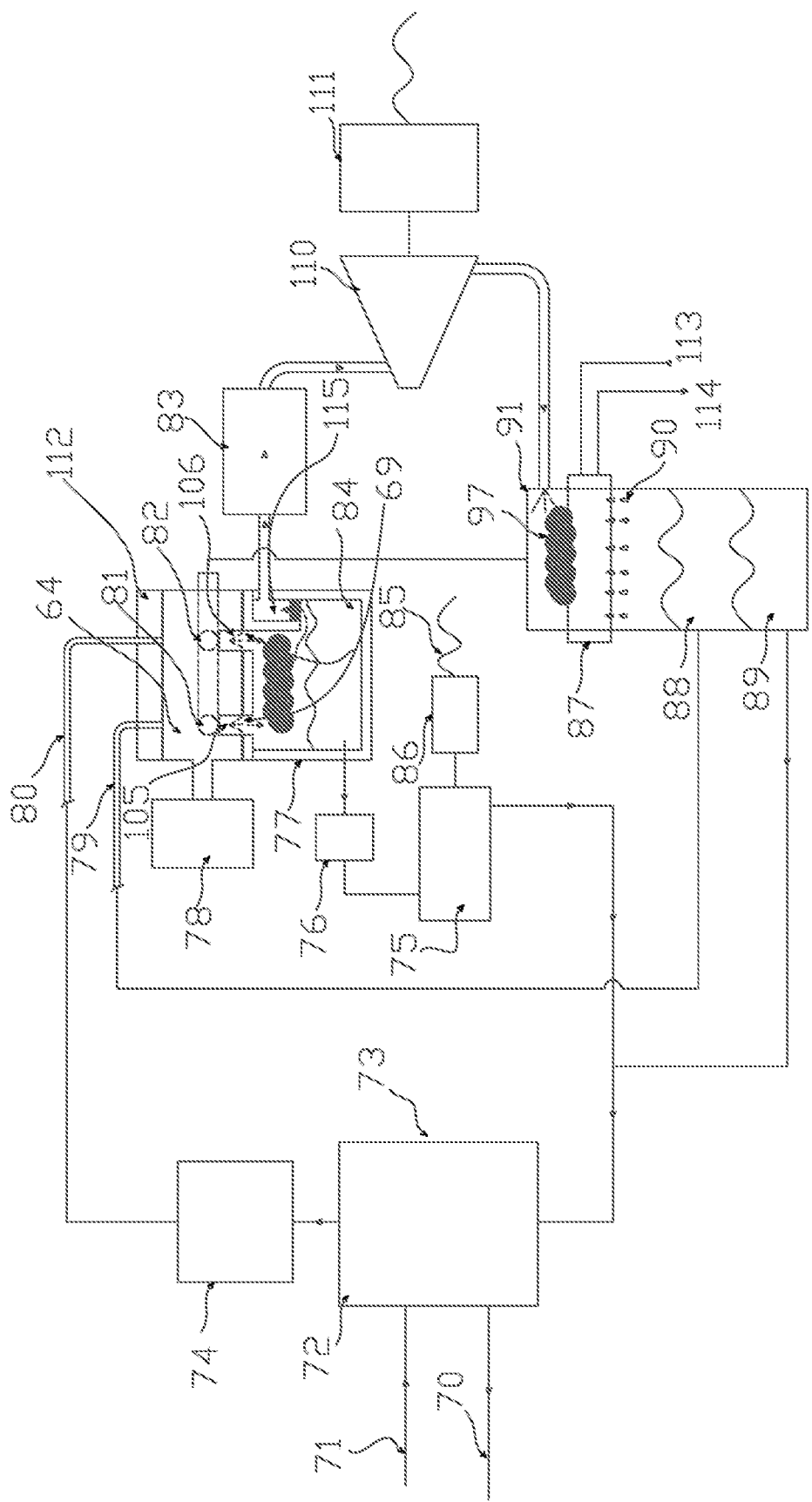
FIG. 8 is a process flow diagram of an emission-less power extraction system in accordance with another embodiment of the present invention employing an external high-pressure rotary injection valve in conjunction with a rotary turbine.

Referring to FIG. 8, there is shown a process flow diagram of an emission-less power extraction system in accordance with another embodiment of the present invention system utilizing a multi fluid direct contact pulsating cycle and employing an external high-pressure rotary injection valve in conjunction with a rotary turbine for the conversion of thermal energy into electricity from sources such as solar, wind, waste heat, geothermal, biomass oxidation according to the present invention.

The unique function of the high-pressure rotary valve as described herein allows for fluids to be injected, without the use of auxiliary pumping equipment, into enclosed spaces such as a piston bore in a reciprocating engine; the inlet to a rotary machine such as a Turbine or Sliding Vane Rotary motor, and the like, where high pressure working fluid expansion can take place producing useful work extraction without the use of auxiliary pumping equipment along with the undesirable parasitic loads necessary in Rankine or Organic Rankine type systems.

Thermal energy is supplied to the system via a thermal energy carrier fluid, which could be water, air, thermal oil, or other fluid sources of heat energy. The thermal energy carrier fluid source may be from a storage container (not shown) or it could be a continuous source. The thermal energy carrier fluid is circulated through a heat booster 72 via an inlet 71 and an outlet 70. The heat booster 72 may be a heat exchanger commercially available such as a shell and tube or a brazed plate exchanger such as those sold by companies such as Danfoss. The heat booster 72 includes a heat exchanger coil 73 through which the thermal energy carrier fluid circulates on one side to transfer heat energy to the dense heat transfer fluid that circulates on the other side.

A flow control mechanism such as rotary valve 64 is driven and speed controlled by drive motor 78 and effectively moves fluid pockets 105 and 106 (see. FIGS. 14-17) through three distinct cycles, each of which see fluid pockets 105 and 106 sealed off from the other ports in the valve body. Firstly, as drive motor 78 rotates the valve, fluid pockets 105 and 106 rotate to become aligned only with inlet ports 79 and 80. Upon alignment motive fluid enters and fills fluid pocket 105 and dense heat transfer fluid enters and fills fluid pocket 106. Secondly, as rotation continues, fluid pockets 105 and 106 are momentarily isolated from all outlet ports as well as from each of pockets 105 and 106 by the a seal provided by a lubricated contact between rotating valve body 64 and valve body housing 112 (which operate as a air-bearing which is commonly know in the industry and as sold by companies such as Neway Air Bearings). As rotation continues the fluid pockets come into alignment only with inlet ports 69 allowing the contents of pockets 105 and 106 to be released into expansion chamber 77 causing a rapid thermal reaction between the motive fluid and the dense heat transfer fluid with a corresponding pressure increase in expansion chamber 77. Thirdly, rotation continues to momentarily seal fluid pockets 105 and 106 from inlet ports 69 and expansion chamber 77 and, as rotation continues, to become aligned only with low pressure equalization ports 81 and 82 allowing fluid communication of fluid pockets 105 and 106 with density separation chamber 91 allowing all residual volume of mixed motive fluid and dense heat transfer fluid remaining in fluid pockets 105 and 106 to travel to density separation chamber 91 effectively re-setting the pressure in fluid pockets 105 and 106 to the low pressure side of the cycle and ready to be recharged. The cycle continues through the three main steps with sealing/isolation taking place between each position due to the air bearing or lubricated seal between rotary valve 64 and valve housing 112 as described above preventing the motive fluid and dense heat transfer fluid from directly entering expansion chamber 91 or the high-pressure mixture of motive fluid and dense heat transfer fluid produced upon contact in expansion chamber 91 from exiting through the equalization ports 81 and 82. Delivery of the desired amount of volume of dense heat transfer fluid and motive fluid for a target mass flow or power output can be varied and controlled by adjusting the RPM of the rotary valve spool which is driven by motor 78 which would be controlled by a industry standard PLC system via a variable frequency drive (VFD) drive to motor 78 as well as the diameter and length of the rotary valve spool as well as the size of the fluid pockets 105 and 106.

Dense heat transfer fluid is pumped through the heat exchanger 73 in the heat booster 72 by hydraulic motor 75 where it picks up heat energy from the thermal energy carrier fluid. The dense heat transfer fluid is then flowed through an accumulator 74 that absorb the pulsation caused by the opening and closing of the rotary valves as described. Accumulator 74 may be a piston hydraulic piston accumulator or a hydraulic bladder accumulator such as for example sold by Parker. After the accumulator 74, the dense heat transfer fluid flows to inlet 80 and then to fluid pocket 106 as rotary valve 64 rotates to align inlet 80 with fluid pocket 106.

The motive fluid contained in the lower portion of density separation chamber 91 travels to inlet 79 and enters fluid pocket 105 as rotary valve 64 rotates to align inlets 79 and fluid pocket 105. Rotary valve 64 continues its axial movement effectively isolating fluid pockets 105 and 106. As the rotation of valve 64 continues, pockets 105 and 106 come into alignment only with expansion chamber 77 via port 69. As the fluid pockets 105 and 106 align with port 69 the motive fluid contained in pocket 105 and the dense heat transfer fluid contained in pocket 106 make direct contact resulting in a thermal reaction between the motive fluid and the dense heat transfer fluid causing a rapid phase change of the motive fluid and a corresponding increase in pressure in the expansion chamber 77. Dense heat transfer fluid flows from expansion chamber 77 via pulse eliminator/accumulator 76 and then into recirculation pump 75 and then into heat exchanger 73 to continue the cycle as described above.

A partial density separation of the motive fluid and the dense heat transfer fluid takes place in the expansion chamber 77 resulting in the motive fluid leaving expansion chamber 77 via port 110 in a substantially vapour phase and under high pressure. Motive fluid leaves expansion chamber 77 and travels through pulse eliminator/accumulator 83 and then into turbine 110. Work is extracted via a work extracting mechanism that extracts work from the pressurized fluids by way of pressure let down, such as, turbine 110 via electrical generator 111 or similar machinery. As the motive fluid passed through turbine 110 and work is extracted, pressure and temperature are reduced as mechanical work is performed by turbine 110 on electrical generator 111. The motive fluid then exits turbine 110 and enters density separation chamber 91 in a multiphase condition being a mixture of liquid and gas as represented by 97. Cooling and return to 100% liquid condition takes place as the motive fluid passed through condenser 87 and leaves condenser 87 as 100% liquid phase 90. Energy is removed during the condensing process by condenser 87 which circulates a cooling fluid through the condenser via condenser inlet 113 and condenser outlet 114. The cooling medium can be air, water, refrigerant or other low temperature fluids coming from unrelated process. At this point the motive fluid is at the bottom of its temperature and pressure cycle and is ready to continue via port 79 and into fluid pocket 105.

Figure 9:
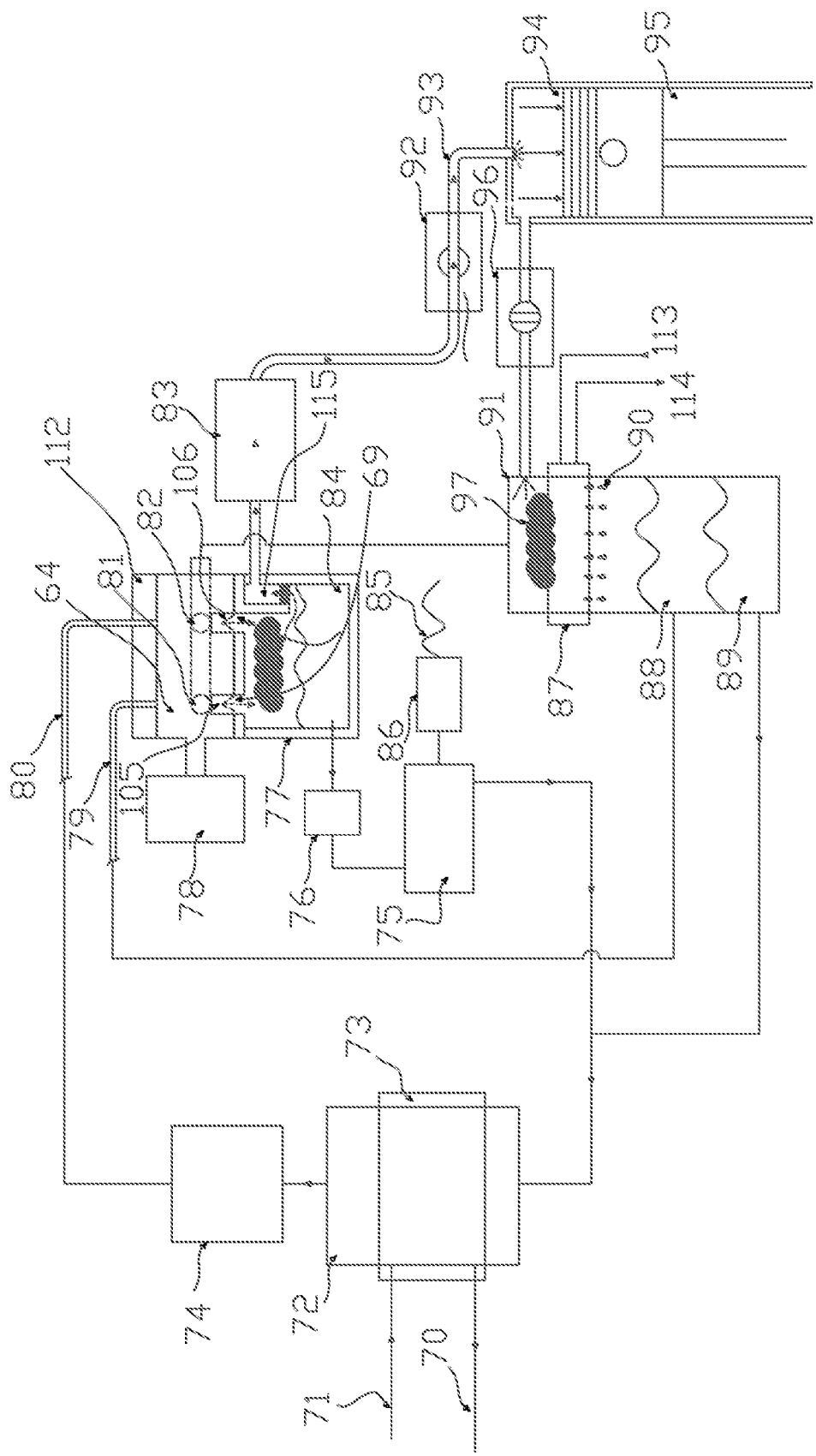
FIG. 9, is a process flow diagram of an emission less power extraction system in accordance with another embodiment of the present invention employing an external high-pressure rotary injection valve in conjunction with a piston expansion engine.

Referring to FIG. 9, there is shown a process flow diagram of an emission less power extraction system in accordance with another embodiment of the present invention system utilizing a multi fluid direct contact pulsating cycle and employing an external high-pressure rotary injection valve in conjunction with a piston expansion engine for the conversion of thermal energy into electricity from sources such as solar, wind, waste heat, geothermal, biomass oxidation according to the present invention. Work is extracted via a work extracting mechanism that extracts work from the pressurized fluids by way of pressure let down, in this case, the reciprocating pistons in the piston expansion engine that turn an output shaft.

The system is like that shown in FIG. 8 except that the motive fluid after the pulsation damper 83 is flowed through valve 92 and into piston chamber 94.

The timing of inlet valve 92 and exhaust valve 96 may be controlled electronically, via a camshaft and valves or other methods such as the rotary valve detailed in FIGS. 14-17. Power extraction is accomplished by operating two cycles with a reciprocating expansion engine. During the power cycle, when piston reaches top dead centre, exhaust valve 96 closes and inlet valve 92 opens allowing high pressure motive fluid flow from expansion chamber 77 to enter the piston cavity via port 93. Inlet valve 92 can remain open for a portion of the downward travel of the piston or it can be closed at any point in the downward travel of the piston depending on the level of pressure drop and power extraction desired. The high-pressure motive fluid drives the piston downward turning a crankshaft and power extraction device attached to that crankshaft of some sort know in the industry. As the piston reaches the bottom of the stroke valve 92 is closed and exhaust valve 96 is opened. As the piston travels upward the cooled and lower pressure motive fluid is expelled from the piston cavity and travels through exhaust valve 96 into density separation chamber 91 where the motive fluid, 88, is condensed and ready to continue to the top of the cycle as described above.

Referring to FIGS. 10-13, there is shown various views of an external high-pressure rotary injection valve. These figures show the external high-pressure rotary injection valve in three distinct parts of the rotational cycle of the valve.

Figure 10:
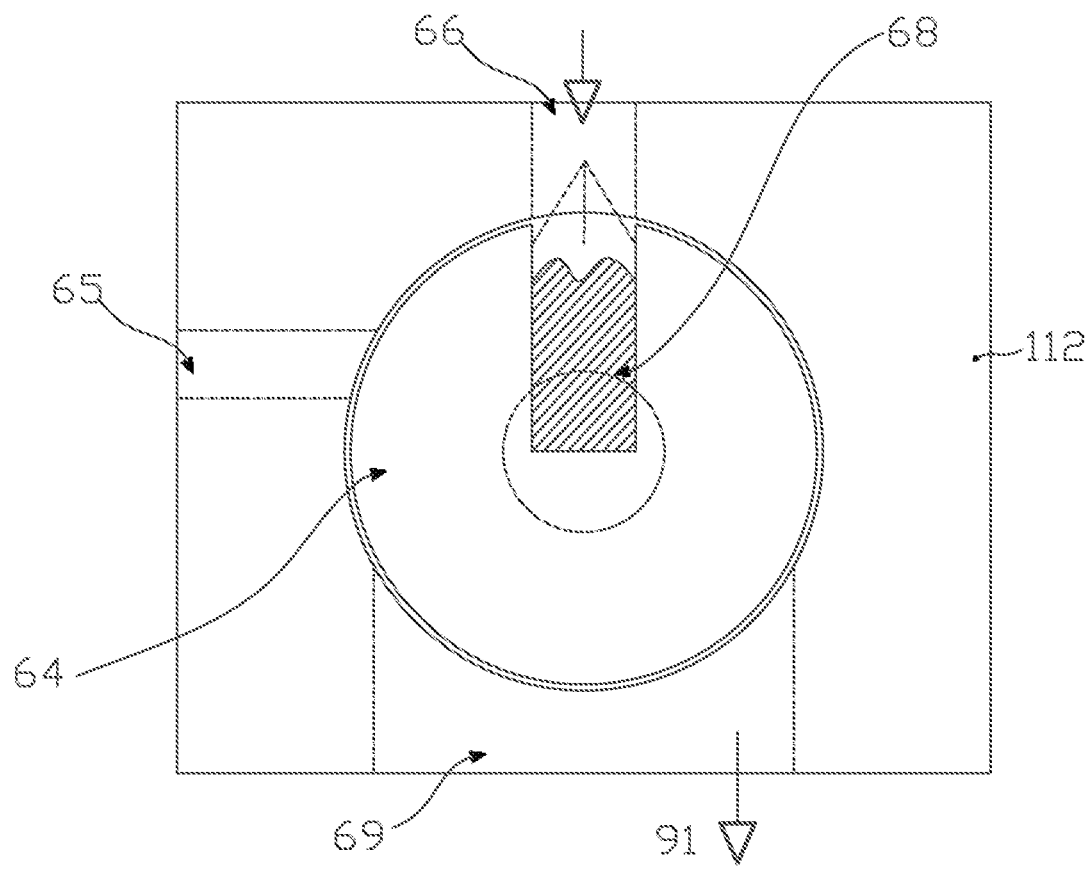
FIG. 10 is an end view of an external high-pressure rotary injection valve in the filling phase of its rotation.

FIG. 10 shows an end view of an external high-pressure rotary injection valve in the filling phase of its rotation. Central shaft, 64 is positioned to align inlet port 66 with fluid pocket 68 and is being filled with either motive fluid or dense heat transfer fluid.

Figure 11:
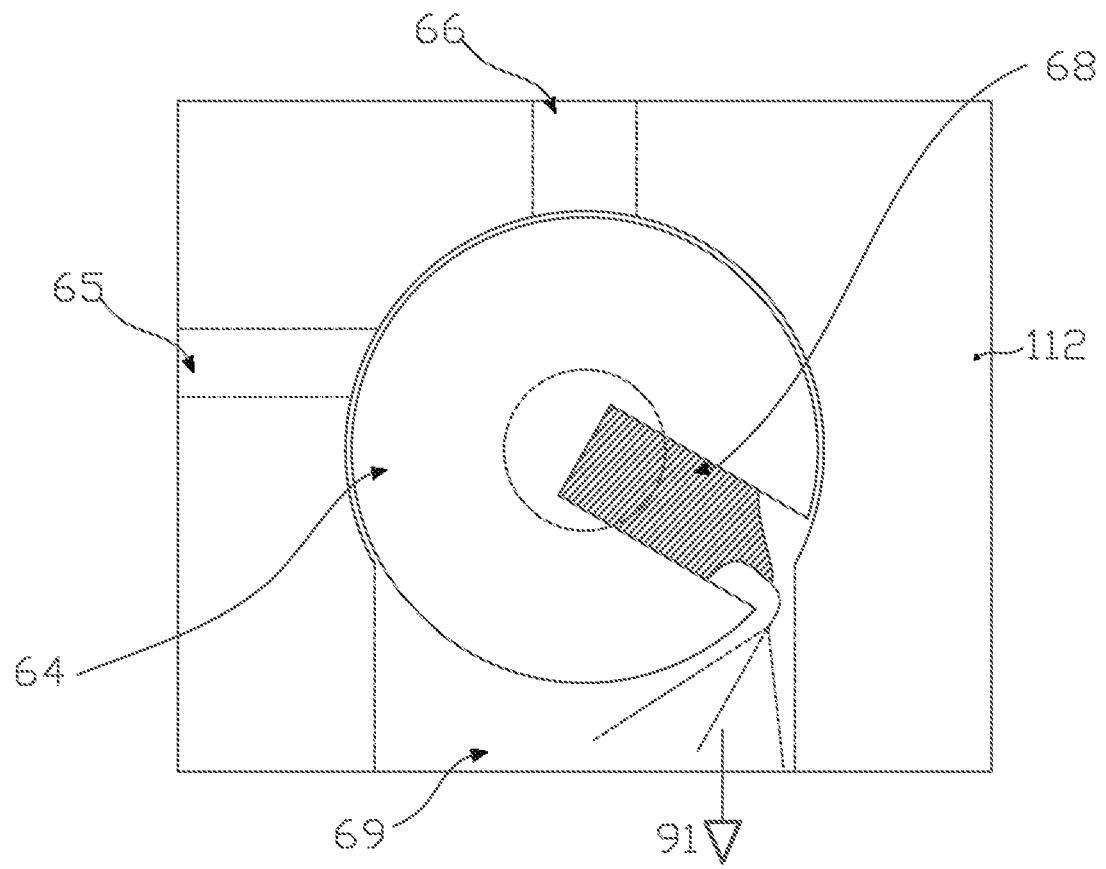
FIG. 11 is an end view of an external high-pressure rotary injection valve of FIG. 10 in the injection phase of its rotation.

FIG. 11 shows an end view of an external high-pressure rotary injection valve in the injection phase of its rotation. Central shaft, 64 is positioned to align fluid pocket 68 with the inlet port to expansion chamber 69, causing fluid pocket 68 to inject either motive fluid or dense heat transfer fluid into expansion chamber via inlet port 69.

Figure 12:
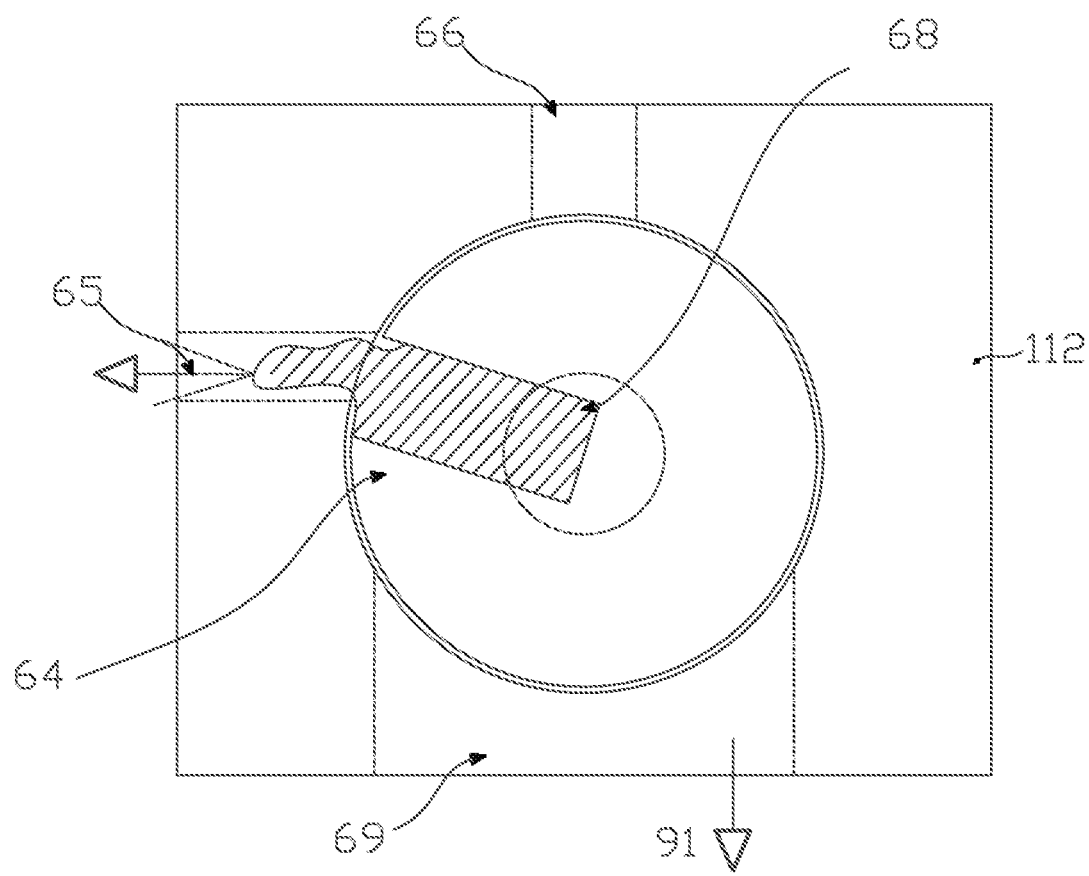
FIG. 12 is an end view of an external high-pressure rotary injection valve of FIG. 10 in the exhaust phase of its rotation.

FIG. 12 shows an end view of an external high-pressure rotary injection valve in the exhaust phase of its rotation. Central shaft, 64 is positioned to align fluid pocket 68 with the exhaust port 65 allowing any residual fluid remaining motive fluid or dense heat transfer fluid remaining in fluid pocket 68 to be emptied into density separation chamber 91 via inlet port 69.

Figure 13:
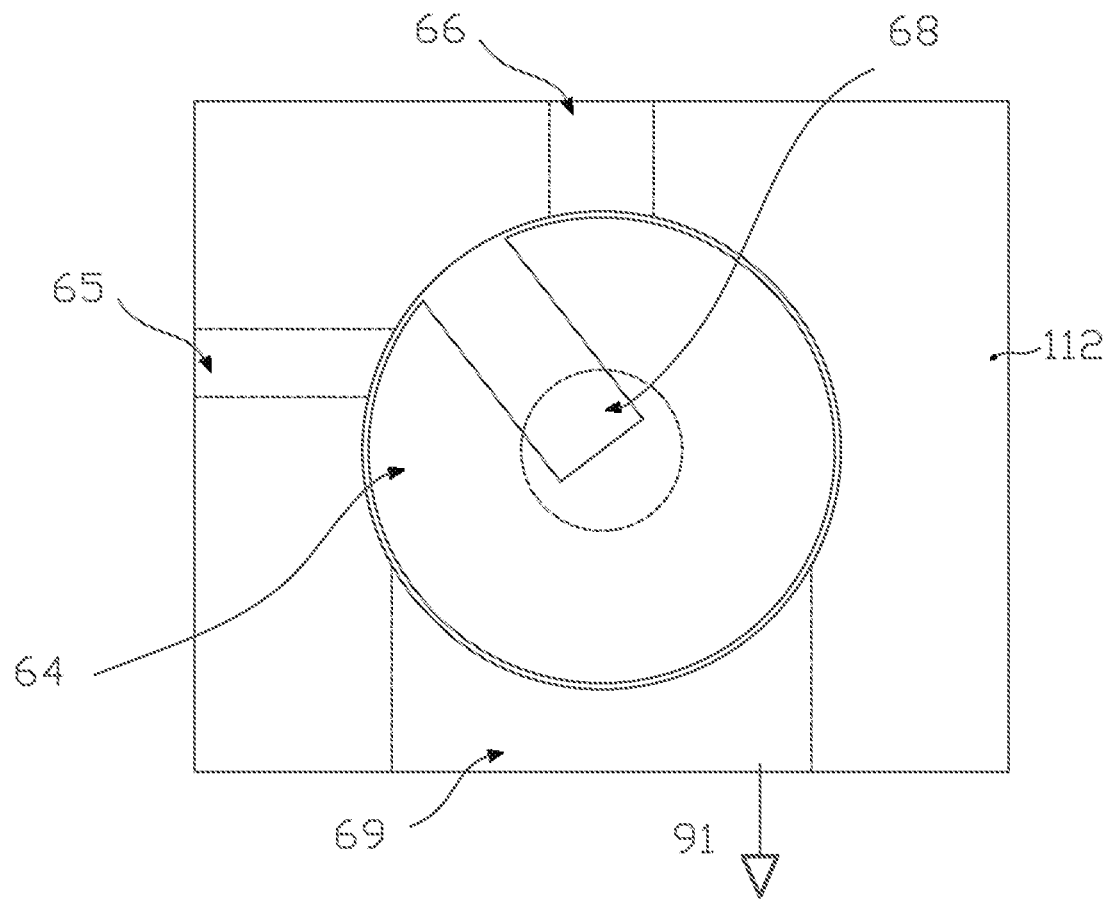
FIG. 13 is an end view of an external high-pressure rotary injection valve of FIG. 10 showing one example of three possible positions in the cycle where the fluid pockets are isolated or sealed from any communication or flow.

FIG. 13 shows an end view of an external high-pressure rotary injection valve showing one example of three possible positions in the cycle where the fluid pockets are isolated or sealed from any communication or flow. Central shaft, 64 is positioned to so that fluid pocket 68 is not aligned with either of ports 65, 66 or 69 and is isolated or sealed. This condition occurs three times during each rotation of the valve spool.

Figure 14:
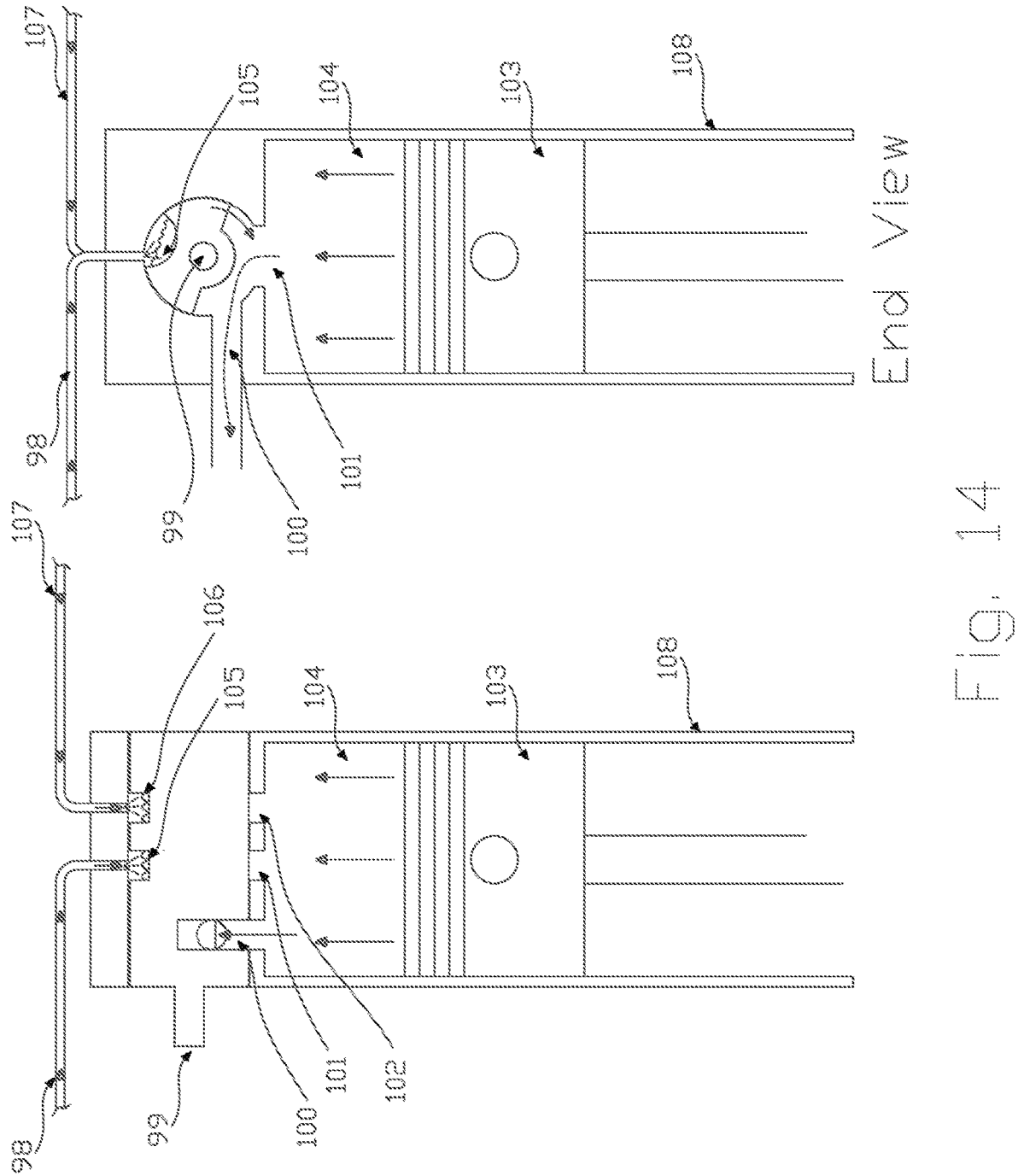
FIG. 14 is an external high-pressure rotary injection valve in conjunction with a reciprocating piston expander in the exhaust and pocket fill phase of the rotational cycle.
Figure 15:
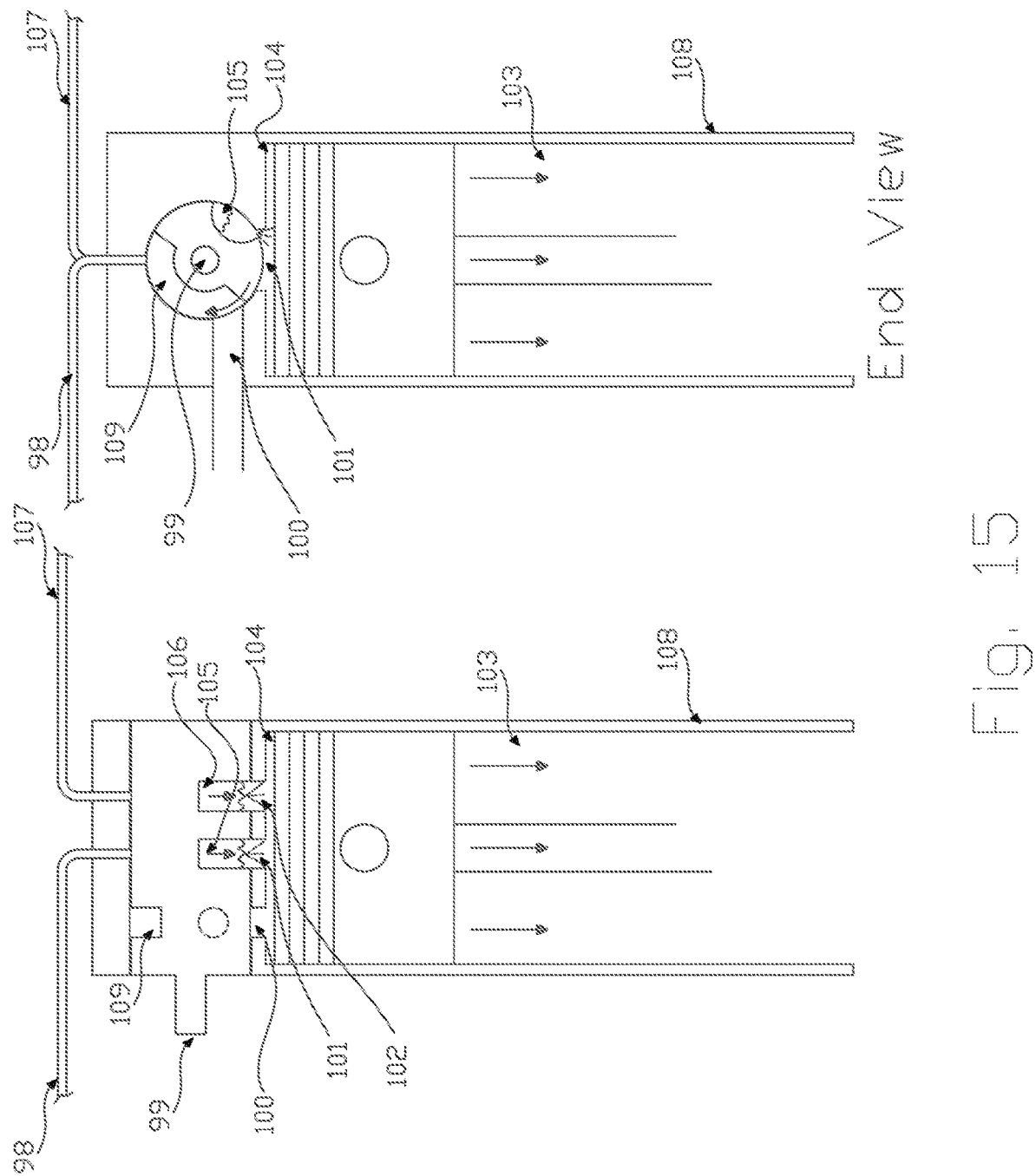
FIG. 15 is an external high-pressure rotary injection valve in conjunction with a reciprocating piston expander of FIG. 14 in the power phase of the rotational cycle.
Figure 16:
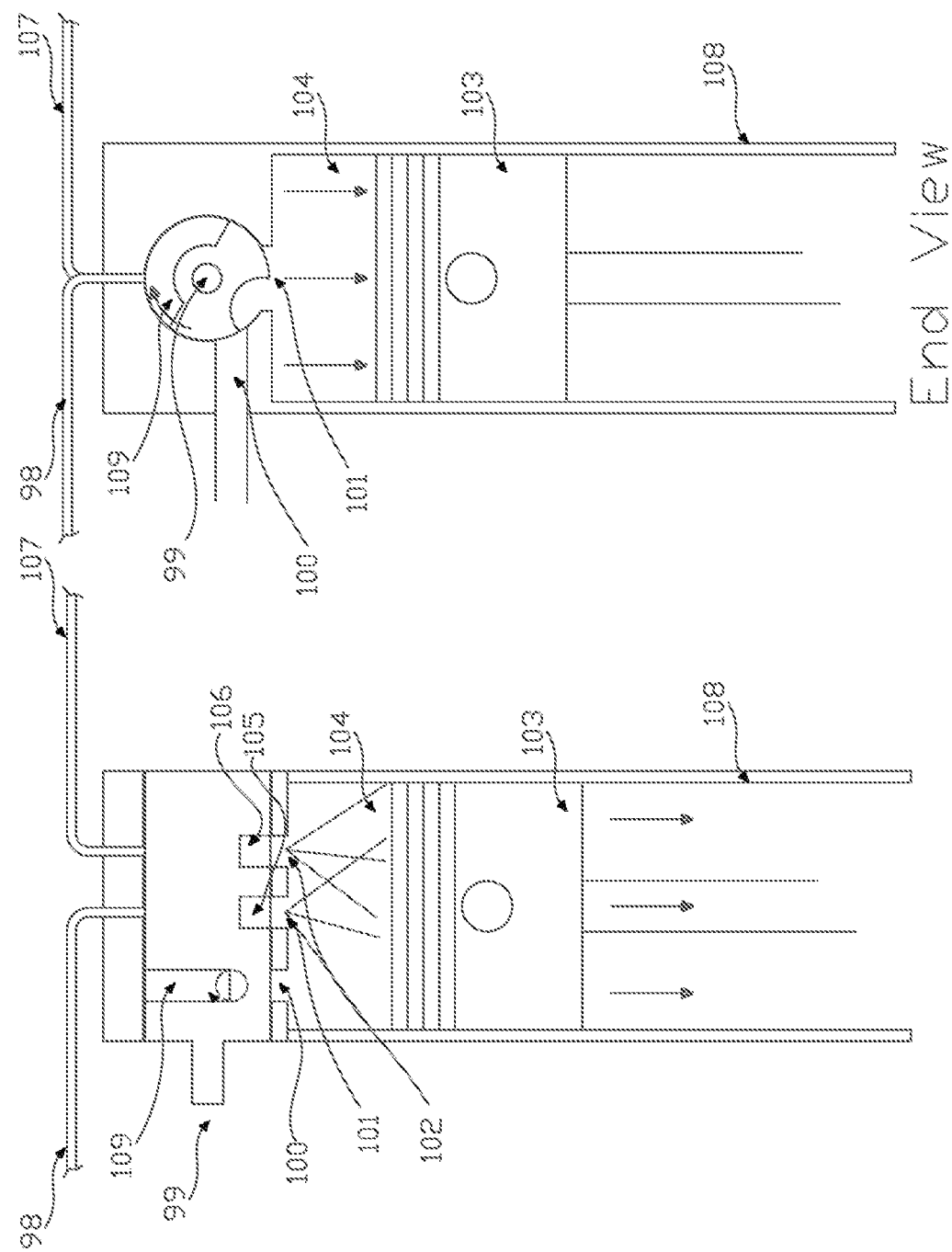
FIG. 16 is an external high-pressure rotary injection valve in conjunction with a reciprocating piston expander of FIG. 14 in the power/expansion phase of the rotational cycle.

Referring to FIG. 14-16, there is shown end and side view diagrams of an emission-less power extraction system in accordance with another embodiment of the present invention system utilizing a multi fluid direct contact pulsating cycle and employing an external high-pressure rotary injection valve in conjunction with a reciprocating piston expander in four different phases of a rotational cycle.

FIG. 14 shows an external high-pressure rotary injection valve in conjunction with a reciprocating piston expander in the exhaust and pocket fill phase of the rotational cycle. Piston 103 is traveling upward in piston bore 104 and exhaust port 100 is in is communication with exhaust pocket 109 allowing the mixture of motive fluid and dense heat transfer fluid resident in the piston bore to exhaust. At the same time, shaft 99 is positioned so that fluid pockets 105 and 106 are a in communication with inlet ports 98 and 107 respectively. Fluid pockets 105 and 106 are being filled with motive fluid and dense heat transfer fluid.

FIG. 15 shows an external high-pressure rotary injection valve in conjunction with a reciprocating piston expander in the power phase of the rotational cycle. Piston 103 is traveling downward in piston bore and valve shaft 99 is positioned so that fluid pockets 105 and 106 and in fluid communication with inlet ports 101 and 102 allowing the motive fluid and the dense heat transfer fluid to come into direct contact with each other causing a rapid thermal reaction resulting in a rapid pressure increase in piston chamber 104 effectively driving the piston downward and delivering work to the crankshaft (not shown). Exhaust port 100 is closed off and exhaust pocket 109 is sealed as well and there is no flow coming in via inlet ports 98 and 107.

FIG. 16 is very similar to FIG. 15 and shows an external high-pressure rotary injection valve in conjunction with a reciprocating piston expander in the power/expansion phase of the rotational cycle. Piston 103 is traveling downward in piston bore 104 with useful work being extracted via the crankshaft (not shown). Valve shaft 99 is positioned so that fluid pockets 105 and 106 are at the final stages of discharging their contents and are remain in fluid communication with inlet ports 101 and 102 allowing any residual motive fluid and dense heat transfer fluid to exit the fluid pockets and into the piston chamber 104. In piston chamber 104 the expansion of the mixture of motive fluid and dense heat transfer fluid continues to drive the piston downward delivering work to the crankshaft (not shown). Exhaust port 100 and exhaust pocket 109 are isolated and closed.

Figure 17:
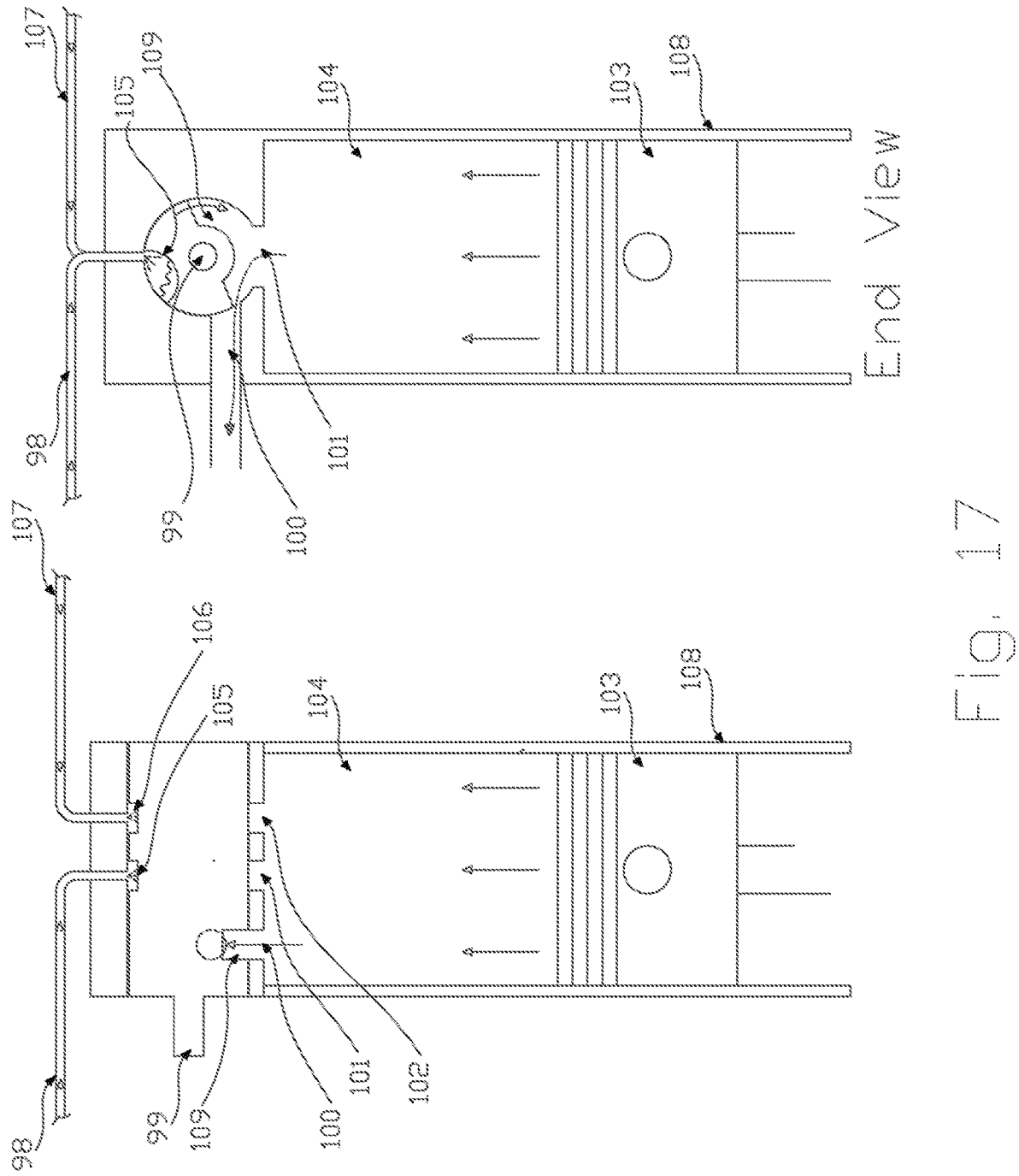
FIG. 17 is an external high-pressure rotary injection valve in conjunction with a reciprocating piston expander of FIG. 14 in the beginning of the exhaust and pocket fill phase of the rotational cycle.

FIG. 17 is very similar to FIG. 14 and shows an external high-pressure rotary injection valve in conjunction with a reciprocating piston expander in the beginning of the exhaust and pocket fill phase of the rotational cycle. Piston 103 is traveling upward in piston bore 104 and exhaust port 100 is in communication with exhaust pocket 109 allowing the cooled and lower pressure mixture of motive fluid and dense heat transfer fluid resident in the piston bore to exhaust. At the same time, shaft 99 is positioned so that fluid pockets 105 and 106 are just beginning to be in communication with inlet ports 98 and 107 respectively. Fluid pockets 105 and 106 are being filled with motive fluid and dense heat transfer fluid.

The key feature/function of the high pressure rotary injection valve is to facilitate the injection of the two or more fluids of which at least one of the fluids is a motive fluid and one of the fluids is a dense heat transfer fluid where at the low pressure side of the rotation as in FIG. 16 each fluid enters into the rotary valve pockets 105 and 106 in isolation from the other fluid allowing the respective fluids to maintain unrelated pressures and temperatures. As the Rotary Valve turns through its axis the fluid pockets come into alignment with ports 101 and 101 and come into open communication with the piston bore 104 where a rapid and high pressure mixture takes place causing a thermal reaction between the motive fluid and the dense heat transfer fluid with rapid expansion taking place as shown in FIGS. 14 and 15, causing the piston 104 to travel downward causing work on the engine crankshaft. The rotary valve then continues in its rotation causing pockets 105 and 105 to travel past openings 101 and 102 to coincide with the piston 103 reaching bottom dead center in its travel and at the working fluids lowest pressure and temperature conditions. Pockets 105 and 106, now containing residual amounts of the combined fluid mixture and at the lowest pressure point of the cycle, become sealed and cease to be in communication with either inlet ports 98 and 97 or with outlet ports 101 and 102. At this point the exhaust 109 and 65 begins to open providing open communication and flow between the piston bore 104 and exhaust port 100 allowing for the piston bore to be emptied of the now cooled and low pressure working fluid mixture as piston 103 rise upward as in FIG. 13. As the Rotary valve continues in its rotation exhaust valve 109 is timed such that it remains open to exhaust port 65 and 109 until piston 103 reaches top dead center. Also during this travel, fluid pockets 105 and 106 have traveled past fluid inlets 98 and 107 as in FIG. 13 and FIG. 9, allowing for the fluid pockets to receive the desired amount of motive fluid and dense heat transfer fluid and to then travel into open communication with ports 101 and 101 allowing for open communication with the piston Bore 104 where the two fluids come into contact with each other causing a rapid and high pressure thermal reaction to take place between the motive fluid and the dense heat transfer fluid with rapid expansion taking place as the motive fluid changes phase as shown in FIGS. 14 and 15, causing the piston 104 to travel downward causing work on the engine crankshaft.

Selection Criteria for the Motive Fluid and the Dense Heat Transfer Fluid.

The motive fluid is chosen based on phase change characteristics. Examples of motive fluids are fluids such as $CO_2$, R134a, R410A and R32. The key features of motive fluid are:

a relatively low temperature boiling point/phase change below 212° F. with relatively high vapor pressure at temperature range between 120° F. and 212° F.;
condensing temperature range within 32° F. and 120° F.; and
low specific gravity to facility density separation from dense heat transfer fluid where the condensed motive fluid will separate and float on top of the dense heat transfer fluid when combined in a storage or settling chamber.

The dense heat transfer fluids are chosen based on desirable phase change characteristics, density, specific heat capacity. Fluids such as ethylene glycol and 1,2,3-propanetriol (glycerol) offer desirable characteristic. Key features of dense heat transfer fluid are:

A relatively high temperature boiling point/phase change above 212° F. The dense heat transfer fluid should not phase change during the complete cycle but simply absorb heat energy and transfer that heat energy to the motive fluid.

A high specific gravity beyond that of the motive fluid to facility density separation from motive fluid. For example, glycerol has a specific gravity of 1.26 and ethylene glycol has a specific gravity of 1.135 at standard temperatures.

A high specific heat capacity.

The motive fluid and the dense heat transfer fluid interact as follows: During the cycle the dense heat transfer fluid is heated to desired upper temperature range of the cycle by an external heat source; the motive fluid is condensed to liquid phase by transferring heat energy into the refrigeration fluid loop as in the detailed description. The motive fluid and dense heat transfer fluid are then combined in a enclosed space such as a pressure chamber such as in accumulator 5 in FIG. 1 or as in a external mixing chamber 77 in FIG. 8 or as in a piston chamber as in 104 in FIG. 13-16. The mass ratio of the dense heat transfer fluid to motive fluid is metered into the enclosed space as required that when combined with the motive fluid the heat energy required to cause a phase change in the motive fluid is transferred by conduction from the dense heat transfer fluid to the motive fluid causing a phase change in the motive fluid and a temperature reduction in the dense heat transfer fluid. An equilibrium of temperature is reach very quickly resulting in the motive fluid being completely changed into gaseous phase and the dense heat transfer fluid remaining in a liquid phase but at a lower temperature. The result of the above reaction is that the expansion that takes place by the motive fluid changing phase causes a dramatic and rapid increase in pressure in the confined space allowing useful work to be extracted by various extraction methods described herein.

While specific embodiments of the invention have been described, such embodiments are illustrative of the invention only and should not be taken as limiting its scope. In light of the present disclosure, many modifications will occur to those skilled in the art to which the invention relates, and the invention, therefore, should be construed accordingly.

The invention claimed is:

1. An apparatus for extracting useful work or electricity from low grade thermal sources comprising:
    a chamber;
    a source of heated dense heat transfer fluid in communication with a heat transfer fluid conduit that is in communication with the chamber;
    a source of motive fluid in communication with a motive fluid conduit that is in communication with the chamber, wherein the motive fluid comprises a liquid phase;
    a flow control mechanism comprising:
        a heat transfer fluid pump to provide a flow of the heat transfer fluid to the chamber;
        a heat transfer fluid valve cooperating with the heat transfer fluid conduit to control the flow of the heat transfer fluid to the chamber;
        a motive fluid pump to provide a flow of the motive fluid to the chamber; and
        a motive fluid valve cooperating with the motive fluid conduit to control the flow of the motive fluid into the chamber;
    wherein the flow control mechanism cooperates with the source of heated dense heat transfer fluid and with the source of motive fluid to deliver said fluids into the chamber in a manner that said fluids come into direct contact with each other in the chamber to effect a phase change of the motive fluid from liquid to gas to increase the pressure within the chamber to yield pressurized fluids, wherein the heat transfer fluid and the motive fluid do not dissolve into each other; and a work extracting mechanism in communication with the chamber that extracts work from the pressurized fluids by way of pressure let down.

2. The apparatus as claimed in claim 1 further comprising a density separator downstream of the work extracting mechanism to separate the dense heat transfer fluid from the motive fluid.

3. The apparatus as claimed in claim 2, further comprising a condenser downstream of the work extracting mechanism to condense the motive fluid into liquid phase.

4. The apparatus as claimed in claim 3, further comprising a first recirculating conduit to the source of motive fluid.

5. The apparatus as claimed in claim 4, further comprising a second recirculating conduit to recirculate the dense heat transfer fluid to the source of heated dense heat transfer fluid.

6. The apparatus as claimed in claim 5, further comprising a heat exchanger communicating with a thermal source and the second recirculating conduit to transfer heat energy from the thermal source to the dense heat transfer fluid to provide the source of heated dense heat transfer fluid.

7. The apparatus as claimed in claim 1, wherein the work extracting mechanism comprises a turbine that is driven by the pressurized fluids to rotate an output shaft to produce work.

8. The apparatus as claimed in claim 1, wherein the work extracting mechanism comprises a reciprocating piston that is driven by the pressurized fluids to rotate an output shaft to produce work.

9. A method of extracting useful work or electricity from low grade thermal sources comprising the steps of:

a. heating a dense heat transfer fluid using heat from a thermal source;

b. providing a flow of the heated heat transfer fluid into a heat transfer fluid conduit in communication with a chamber, and controlling the flow of the heat transfer fluid into the chamber;

c. providing a flow of a motive fluid comprising a liquid phase into a motive fluid conduit, and controlling the flow of motive fluid into the chamber, wherein the heat transfer fluid and the motive fluid do not dissolve into each other;

d. mixing the heated dense heat transfer fluid with the motive fluid in the chamber to effect a phase change of the motive fluid from liquid to gas to increase the pressure within the chamber and yield pressurized fluids; and e. using the energy of the pressurized fluids to produce useful work.

10. The method as claimed in claim 9, wherein the dense transfer fluid is heated in step a. to a temperature of about 34°F to about 210°F.

11. The method of claim 9, further comprising the step of cooling the motive fluid after step e. to effect a phase change of the motive fluid to liquid.

\* \* \* \* \*